United States Patent
Koppensteiner

[11] Patent Number: 6,116,629
[45] Date of Patent: Sep. 12, 2000

[54] COLLAPSIBLE BICYCLE

[76] Inventor: Christian Koppensteiner, Waldmühlgasse 13, Perchtoldsdorf A-2380, Austria

[21] Appl. No.: 09/248,322

[22] Filed: Feb. 11, 1999

Related U.S. Application Data

[63] Continuation of application No. PCT/AT97/00188, Aug. 14, 1997.

[30] Foreign Application Priority Data

Aug. 14, 1996 [AT] Austria ................................ 1471/96

[51] Int. Cl.[7] .................................................. B62K 15/00
[52] U.S. Cl. ........................................... 280/287; 280/278
[58] Field of Search ........................... 280/281.1, 287, 280/278, 279, 288

[56] References Cited

U.S. PATENT DOCUMENTS

| | | | |
|---|---|---|---|
| 3,015,498 | 1/1962 | Tanaka et al. | 280/278 |
| 3,844,611 | 10/1974 | Young | 297/214 |
| 4,170,369 | 10/1979 | Strutman | 280/288 |
| 4,440,414 | 4/1984 | Wang | 280/287 |
| 4,448,437 | 5/1984 | Montague | 280/278 |
| 4,647,059 | 3/1987 | Shan Hai | 280/287 |
| 4,718,688 | 1/1988 | Sanders | 280/278 |
| 4,842,292 | 6/1989 | Wang | 280/278 |
| 4,900,047 | 2/1990 | Montague et al. | 280/278 |
| 5,052,706 | 10/1991 | Tsai et al. | 280/278 |
| 5,269,550 | 12/1993 | Hon et al. | 280/278 |
| 5,398,955 | 3/1995 | Yeh | 280/278 |
| 5,413,368 | 5/1995 | Pong et al. | 280/277 |
| 5,590,895 | 1/1997 | Hiramoto | 280/278 |

FOREIGN PATENT DOCUMENTS

| | | | |
|---|---|---|---|
| 77345 | 2/1949 | Czechoslovakia | 280/278 |
| 4423647 | 1/1996 | Germany . | |
| 2287438 | 9/1995 | United Kingdom . | |
| WO86/05155 | 9/1986 | WIPO . | |

*Primary Examiner*—Lanna Mai
*Assistant Examiner*—Andrew J. Fischer
*Attorney, Agent, or Firm*—Jacobson, Price, Holman & Stern, PLLC

[57] ABSTRACT

The present invention relates to a bicycle, the front and back wheels of which are fitted into a collapsible frame. In the folded or collapsed state, the bicycle length dimensions are reduced as compared with the working state, the back wheel is unilaterally fitted into the frame, and the front wheel is unilaterally fitted to the handlebar holding tube which is rotatably mounted on the frame. The bicycle has two wheels with different diameters, an already well-known design, wherein the front wheel with the smaller diameter is covered, in the collapsed state, by the wheel with the larger diameter, so that the smaller wheel is embedded into the larger one. In the collapsed state, the bicycle thickness may be significantly reduced.

15 Claims, 5 Drawing Sheets

COLLAPSIBLE BICYCLE

This is a Continuation Application based on PCT/AT97/00188 filed Aug. 14, 1997.

FIELD OF THE INVENTION

The present invention relates to a bicycle with a front wheel and back wheel attached to a frame, wherein the frame is collapsible or foldable, wherein in the collapsed or folded position the length dimensions of the bicycle are reduced as compared with the working state and wherein the back wheel is unilaterally fitted onto the frame and the front wheel is unilaterally fitted to the tube bearing the handlebar which is rotatably attached to the frame.

BACKGROUND OF THE INVENTION

These types of folding bicycles, which are sometimes also known as collabsible bicycles or camping bicycles for example, are known in various types of designs. In order to achieve relatively small external dimensions, a plurality of known examples of such folding bicycles are equipped with relatively small wheels. This means that in most cases the bicycles must be driven in quite high gear which naturally causes problems when riding up inclines. These types of folding bicycles usually had only one massively built frame tube with one hinge, the front end of this frame tube being equipped with an attachment for the shaft tube and the rear end in a frame part for attachment of the saddle bar as well as for mounting the crank of the chain drive.

Furthermore, DE 44 23 647 A1 for example has made known designs of folding bicycles which are equipped with wheels comparable with those of standard street bicycles and as such are accordingly comfortable to ride, and corresponding gear shifts on inclines are possible. Furthermore, an accordingly greater amount of gear rings and gear shifts can be installed on these bicycles. In order to fold such bicycles with comparably large front and back wheels, a complicated turning and locking mechanism is usually provided to achieve a corresponding reduction of the length dimensions of the frame. In the case of the well known design of a bicycle in accordance with DE 44 23 647 A1 having a frame with a locking, horizontal turning hinge, around whose axis the hinged-on frame parts can be turned after opening the lock, the frame parts are slideable by means of a horizonally extendable telescope and/or by means of arms being turnable or pivotable around a vertical axis from that position into a plane parallel to each other, whereby in accordance to this DE-A, as is generally the custom, the aim is to create a bicycle which in an easily manageable way can be stowed in a small space and should be equipped with an optimally rigid frame.

Furthermore, in GB-A 2 287 438 folding bicycles have become known whose wheels each have a different diameter. In this well known variety of a collapsible or folding bicycle the wheels are mounted on conventional forks which embrace the wheels on both sides, making it impossible to completely fold the bicycle it such a way that the wheels are embedded in each other or that one wheel overlaps the other.

Thus the disadvantage of all folding bicycle constructions known so far is the fact that a reduction of the length dimensions of the bicycle as compared to its dimensions in its operating or driving position can be achieved, while at the same time having distinctively greater width dimensions in the folded state, which mainly are a result of the fact that due to the mounting of the front and back wheels in correspondingly wide forks, correspondingly large minimum width dimensions of the bicycle in its folded state cannot be avoided. In order to achieve a certain reduction of thickness in the folded state, it has furthermore already been suggested to at least remove the front wheel from its fork, which of course involves additional work and would require that the front wheel would need to be transported separately in the folded state. In particular the relatively large width of the bicycle also in its folded state due to the mounting of the front and back wheels in forks of course results in problems when transporting the folded bicycle.

In addition to bicycles with foldable frames to reduce the length dimensions of the bicycle as compared to the length dimensions in its operating state, other designs are also known, wherein the height dimensions of the bicycle in its folded state can be reduced by means of correspondingly joining together frame tubes. In these types of constructions, folding together the frame tubes to achieve height reduction naturally results in a reduction of the distance between the front wheel and the back wheel, so that in this case there also arise problems with regards to transporting the bicycle in its folded state, especially with regard to the large total length of the bicycle, even though the width of the bicycle in the case of suitably adjustable handlebars basically is limited to the width of the forks for mounting the front and back wheel as well as the to the crank drive. Naturally only very small wheels can be used for such constructions, which again results in the above-mentioned problems regarding riding comfort and driving characteristics especially with regard to inclines.

SUMMARY OF THE INVENTION

The present invention focuses on developing the above discussed type of bicycle in such a way as to achieve the smallest width possible when in the folded state, thus enabling easier transportion and handling. At the same time the inventive bicycle should allow the possibility of utilizing wheels which correspond to those of standard street bicycles, thus providing greater riding comfort.

The solution of this problem is that the inventive bicycle, based on the type of bicycle mentioned above, is mainly characterized by the fact that the wheels have differing diameters, wherein the wheel with the smaller diameter in the folded position of the frame is embedded into the wheel with the larger diameter. The proposed unilateral or one-sided mounting of the back wheel on the frame as well as the front wheel on the pivoting shaft tube bearing the handlebars enables a simple way of correspondingly reducing the width of the space required to mount the front and back wheels, due to the fact that there is no need for the forked tubes which in any case exceed the width of the mounting of the rotational axle of the wheels. Due to the fact that the invention also provides for wheels with differing diameters, with the wheel with the smaller diameter being encompassed by or embedded into the wheel with the larger diameter when the bicycle is in a folded state, the result in combination with the unilaterally mounted wheels is the possibility of a substantial reduction in thickness or width of the bicycle in the folded state, because the wheel with the smaller diameter can be fully accomodated inside the rim of the wheel with the larger diameter when the bicycle is in the folded state. To achieve corresponding driving characteristics and a certain riding comfort, the back wheel will be designed to be larger than the front wheel, so that standard driving installations and shift gears can be used.

In order to assure that the wheel with the smaller diameter is essentially perfectly embedded in or encompassed by the wheel with the larger diameter when in a folded state, the invention preferably provides that the wheels are supported by stronger spokes engaging the rim at the side which is located on the frame with the unilateral support. This kind of design facilitates not only a unilateral mounting of both the front wheel and the back wheel, but also an asymmetrical design of the rim, whereby a corresponding stability is achieved through the design of thicker spokes, so that for achieving the folded position to accomodate the wheel with the smaller diameter in fact essentially the total interior space of the wheel with the larger diameter remains. In this connection it is preferably provided that the back wheel and the front wheel are unilaterally mounted on the side on which the drive chain is arranged on the frame, in order to secure in a simple manner that the wheel with the smaller diameter is easily accomodated in the wheel with the larger diameter.

In order that also in the folded state the inventive bicycle can for example provide for space for a gear shift requiring a greater amount of space, it is preferably provided that one of the wheels has a bearing formed by a hollow shaft, in which in the folded state of the bicycle the bearing of the other wheel is embedded.

In accordance with another preferred embodiment of the inventive bicycle the design is such that the frame is foldable around hinges positioned essentially one on top of the other between the steering axle of the wheels on the tubes of the frame in a vertical direction. By means of such hinges which are essentially aligned vertically one on top of the other on the tubular members of the bicycle frame, a simple folding and turning or pivoting mechanism can be secured which is also easy to use. Due to the fact that the joints or hinges are essentially vertically aligned one on top of the other on different tubular member of the frame, it is furthermore secured that by means of simply turning the frame parts towards each other immediately the normally smaller sized front wheel is inserted in the free space of the rim of the back wheel.

In order to achieve that the wheels are completely embedded in one another, it is furthermore preferably provided that the frame tubes are bent or angled in the area of the hinges, thus allowing that the frame tubes come very close together in the folded position.

In order to achieve such a close position of neighboring frame tubes in the folded position, it can furthermore also be provided that the neighboring parts of the frame tubes are correspondingly moveably attached to an intermediate element, wherein the distance of the hinge connections of the intermediate element at the frame tubes at least minimally exceeds half of the sum of the outer dimensions of the neighboring parts, such as conforms to a further preferred design form.

Generally, these types of hinge connections con be simply and quickly opened by means of simple fasteners or tommy screws and result in an accordingly simple and safe assembly and locking of the bicycle in the operating position.

In an especially preferred way the inventive bicycle can be further developed to such an extent that the frame comprises an upper, rigid frame tube, which is turnable around a hinge which is in a nearly centered position between the steering axles of the wheels, and a lower frame element which is designed as a rope. Because the frame of the bicycle is provided with an upper rigid frame tube which is turnable around the hinge which is nearly centered between the steering axles of the wheels, and a lower frame element which is designed as a rope, an especially simple and quick folding of the bicycle into its folded position is possible because only the locking element on the upper frame tube must be unlocked. Because of the design of the lower frame element as a bendable rope, a sufficient stability of the frame, especially torsion stability, is furthermore secured in a simple way even under high stress during driving, so that in addition to a simplification of the folding mechanism or collapsing or folding procedure, a significant weight reduction of the bicycle can also be achieved.

Alternatively to design forms in which the frame tubes are divided by hinges and neighboring parts of the frame tubes are turned relatively together, a modified design of the inventive bicycle with a frame consisting of two frame elements each of which form a sharp angle and which are turnably fitted around a frame tube carrying the saddle, is provided for. Such a frame divided in two parts, one part serving as bearing of the wheel and the other part having the attachment for the shaft tube for the fastening of the front wheel and the handlebar, can in a sample way be attached to the frame tube bearing the saddle, wherein the frame tube bearing the saddle can, for example, be fully encompassed by the respective free ends of the frame parts. Through simple loosening of respective locking devices, a turning of the frame parts around the frame tube bearing the saddle can be achieved and secures again the insertion of one wheel in the free space in the rim of the other wheel due to the unilateral attachment of the wheels.

As already indicated above, the total width of the bicycle in the folded position is essentially determined by the opposing position of the frame parts which are turnable towards each other in the folded position, whereby in this connection the invention preferably provides that frame tubes are essentially in a parallel position or respectively in a position in which one covers the other. Due the fact that the frame tubes are essentially in a parallel position or respectively in a position in which one covers the other, the complete embedding of one wheel in the free space of the rim of the other wheel is secured.

Especially when using two frame parts which are attached in a turnable way around the frame tube bearing the saddle, the problem results, due to the fact that the frame tube bearing the saddle normally forms an angle with the vertical line of the frame, that when turning the frame tube, which is at a relative angle to the vertical, an insertion of the front wheel in the free space of the rim of the back wheel and due to the geometric circumstances while turning the frame parts towards one another, a relatively small front wheel would be necessary. However, in order to essentially utilize the total free space provided by the back wheel and therefore also be able to insert an accordingly largely dimensioned front wheel, it is preferably provided that the shaft tube bearing the front wheel and the handlebar is height-adjustably attached to the frame. Because of such height adjustability of the shaft tube in the folded position of the bicycle, a position of the front wheel can be simply achieved in which it can be completely embedded in the free space of the rim of the back wheel.

For a simple adjustment of the handlebar, the invention preferably provides that the handlebar is attached to the shaft tube by means of a locking or latching device and is moveable in an aligned position with the wheels and the frame tubes in the folded position of the frame. By means of for example such a locking device it is possible in a simple way without any complicated adjustments to achieve the required position for the operating position of the bicycle and also a folded position for minimization of the width of the folded bicycle with the wheels and frame tubes in an essentially aligned position.

For a simple and reliable locking of the frame elements, which are turnable or foldable, the invention preferably provides that the parts of the frame tubes which are turnable towards one another are lockable by means of jigs both in the operating position of the bicycle as well as in the folded position of the frame. With such a design it is possible to simply and effortlessly rebuild the bicycle from its folded position to its operating position.

For an additional reduction of the width of the bicycle in the folding position it is furthermore preferably provided that the pedals are turnable into a position being adjacent to or aligned with the crank.

To reduce the height of the bicycle in the folded position it is provided that the saddle can be lowered from the operating position to a pulled-in position by means of a hinge mechanism, such as provided for in a further preferred embodiment of the inventive bicycle.

BRIEF DESCRIPTION OF THE DRAWINGS

The invention is explained in the following on the basis of exemplary embodiments being schematically shown in the attached drawings. In these.

DETAILED DESCRIPTION OF THE PREFERRED EMBODIMENTS

Figure 1:
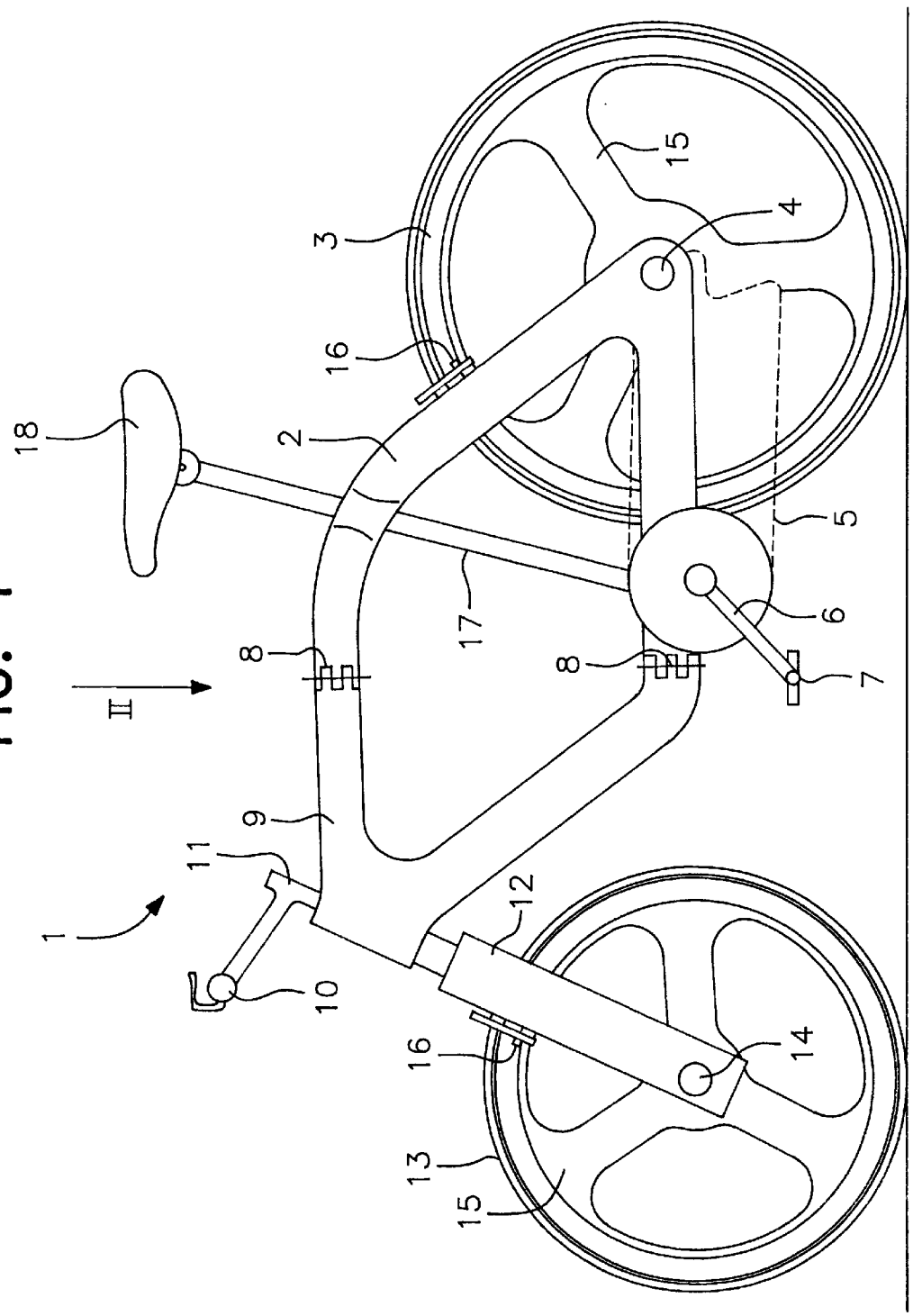
FIG. 1 shows a schematic side view of an inventive bicycle.

In FIG. 1, 1 generally shows a foldable or collapsible bicycle, wherein a back wheel 3 is unilaterally attached around a turning axle 4 on a rear frame part 2. A well-known chain drive is schematically shown with 5 and a crank mechanism 6 is provided with pedals 7 which are pivotable into a position adjacent to crank mechanism 6 along dotted axis line 7'.

The rear frame part 2 is connected to the front frame part 9, on which a shaft tube 11 bearing a handlebar 10 is attached, by means of schematically indicated hinges 8, which will later be described in further detail. On shaft tube 11 a front wheel 13 is unilaterally turnably attached around a turning axle 14 with an arm 12. In order to achieve a sufficient stability, both the front wheel 13 and the rear wheel 3 have thicker spokes 15.

Well-known brake mechanisms both for the front wheel 13 and the rear wheel 3 are schematically indicated with 16. The rear frame part 2 is furthermore provided with an additional frame tube 17, which serves to support a saddle tube bearing a saddle 18.

Figure 5:
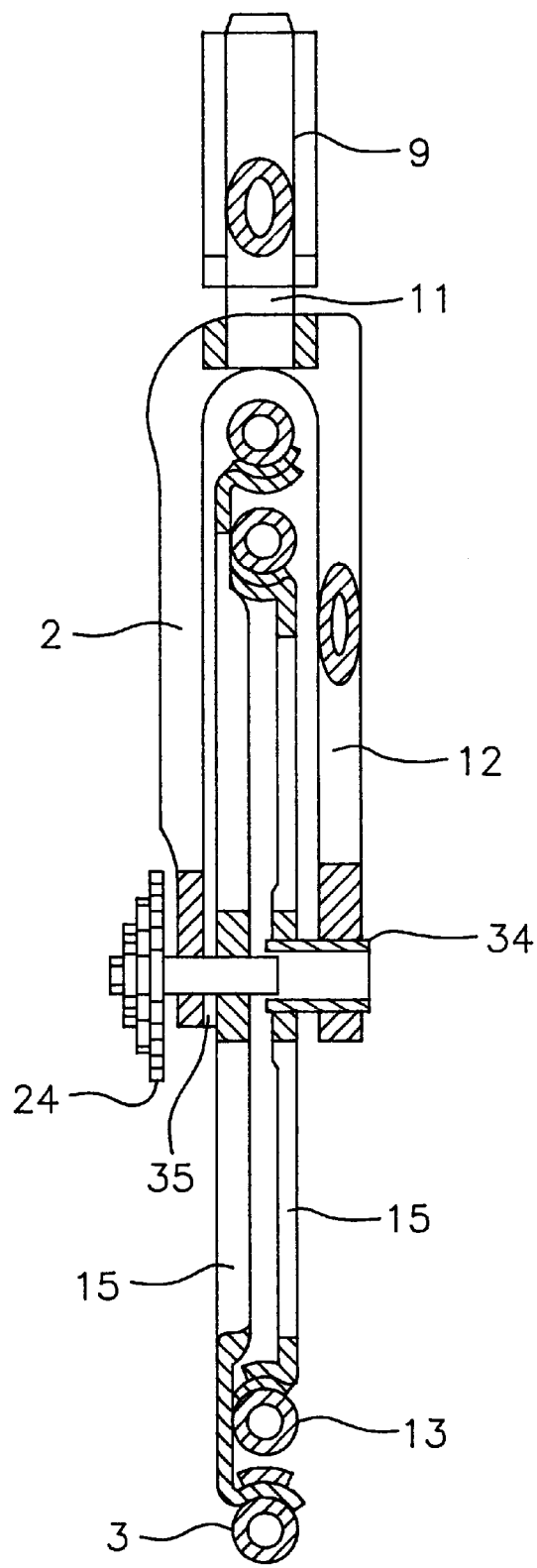
FIG. 5 shows a front view, partially in a cross section, of the bicycle according to FIG. 1 in folded position.

As can immediately be seen in FIG. 1, the front wheel 13 is designed with less outer diameter than that of rear wheel 3, so that when the frame parts 2 and 9 are turned or pivoted around the essentially vertical axis as defined by the hinges 8, the front wheel 13 is completely embedded in the remaining free space of the rim of the rear wheel 3 as a result of the unilateral or one-sided support of the rear wheel 3, and in this way a very small width of the bicycle in the folded position can be achieved, as is illustrated in greater detail in FIG. 5. Here, as shown in FIG. 1, the unilateral support of both the front wheel 13 as well as the rear wheel 3 on the side of the bicycle is planned, on which the chain drive 5 and the crank mechanism 6 belonging to it are attached.

Figure 2:
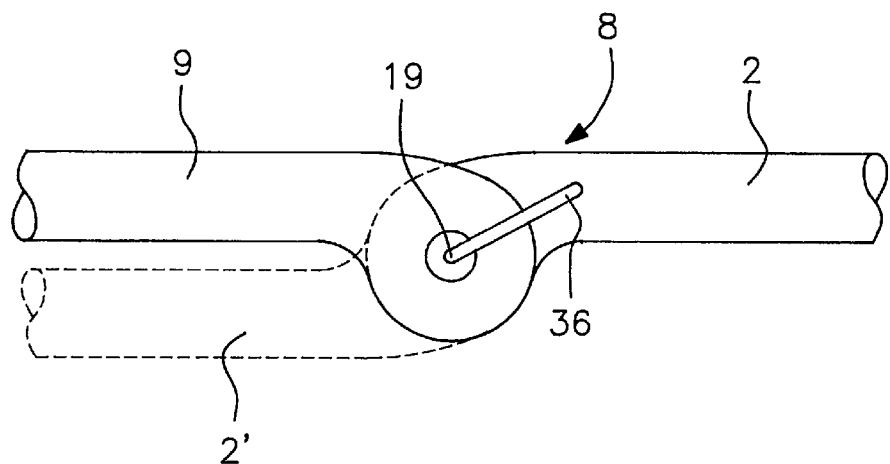
FIG. 2 shows in enlarged scale a schematic top view of a hinge connection between moveably joined frame parts in accordance with arrow II of FIG. 1.
Figure 3:
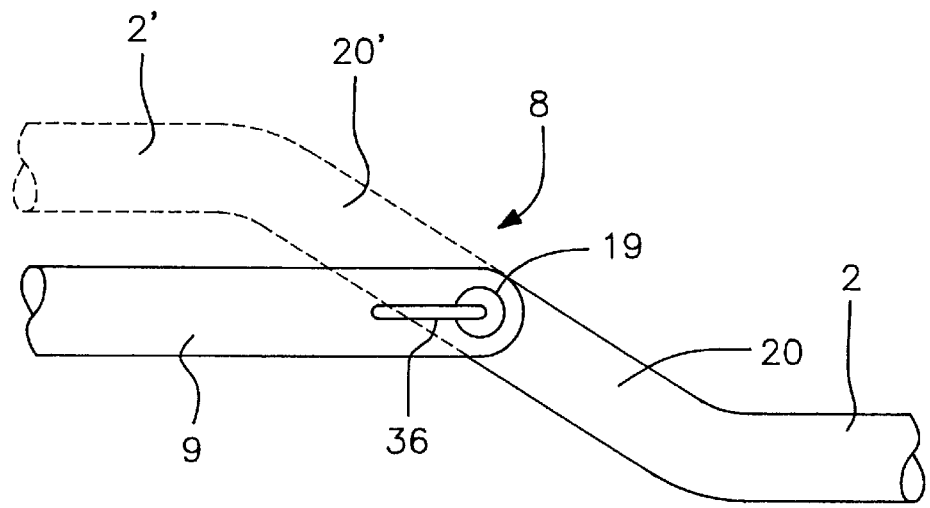
FIG. 3 shows in a similar view as FIG. 2 an altered embodiment of the hinge connection.
Figure 4:
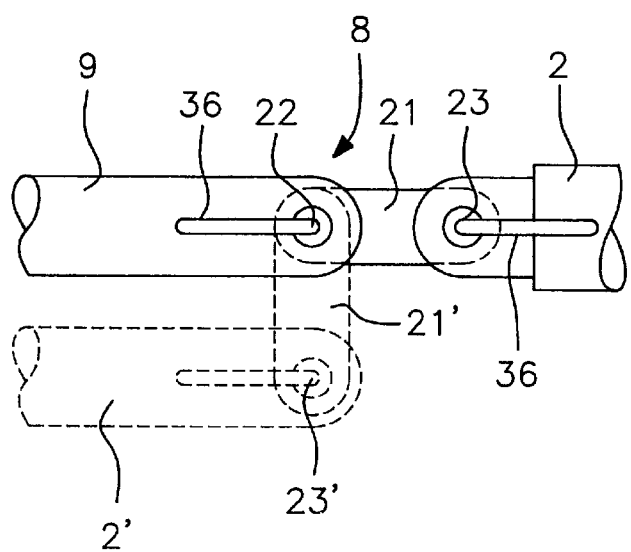
FIG. 4 shows in a similar view as FIGS. 2 and 3 a further modified embodiment of the hinge connection.

FIGS. 2 to 4 show different embodiments of the hinge connections, generally designated as 8, between the rear frame part 2 and the front frame part 9. In these figures the positions of frame parts 2 and 9 in the operating state, i.e driving state, of the bicycle are indicated by solid lines, whereas dotted lines indicate the position of the frame part 2' after being pivoted or collapsed about the hinge 8, wherein jigs to fix the frame parts 2 and 9 are schematically indicated with 36.

In the design according to FIG. 2 the front and rear frame parts 9 and 2 are turnably or pivotably connected with each other around an axle 19, wherein in the operating state the frame tubes and frame parts 2 and 9 joining each other are essentially arranged in alignment with each other. In the folded or collapsed position an essentially parallel position of the frame parts 9 and 2 relative to one another is achieved by means of the bent design of the adjacent ends of frame parts 2 and 9, when they are turned around the axle 19, with the result that an extremely small amount of space is required in the folded position.

In the embodiment according to FIG. 3, the adjoining frame parts 2 and 9 are once more turnably hinged together around axle 19. Because of the design of the frame part 2 with an angled end 20, an essentially parallel position of the tubes or the frame parts 9 and 2' in relation to each other results when turning or folding around the axis 19.

In the further altered embodiment of the hinge 8 according to FIG. 4, the adjoining frame parts are connected with each other by means of an intermediate element 21, therein the intermediate element 21 is turnably hinged to both the adjoining frame parts 2 and 9. When turning the one frame part in the position 2', the frame parts 2' and 9 can again move into an essentially parallel position, wherein for this purpose the length or the dimensions of the intermediate element 21 must conform with the dimensions of frame parts 2 and 9.

In all of the examples of illustrated hinge connections in FIGS. 2 to 4, respective jigs and clamp handles are used, which facilitate a simple positioning and fixing of the frame parts 2 and 9, both in the operating position and in the folded position.

In the illustration according to FIG. 5 it can be seen how in the folded position the front wheel 13 is completely encompassed by the back wheel 3, because, due to the unilateral or one-sided position or support of the wheels on the rear frame part 2 or on the arm 12 of the shaft tube 11 and also due to the unilateral or one-sided provision of the thicker spokes 15, a corresponding free space is created in the back wheel 3. In order to achieve that the wheels 3 and 13 are arranged as closely as possible, the support of the front wheel 13 is constructed as a tubular or hollow axle 34 and that of the back wheel 3 as support or bearing 35. In FIG. 5 furthermore the chain drive is indicated with 24, whereas the position of the handlebar, brought in an essentially aligned position with the folding frame parts as well as the saddle, is not shown in FIG. 5.

It can be immediately seen that because of the embedding of the front wheel 13 in the free space of the rim of back wheel 3 being provided by the unilateral or one-sided support of the wheels and through the special design of the support of both wheels 3 and 13, a very small width of the bicycle in the folded position is achievable, where the outside dimensions are essentially determined by the central line of the bicycle and the unilateral frame parts or the arms 2 and 12 for the support of the wheels 3 and 13.

Figure 6:
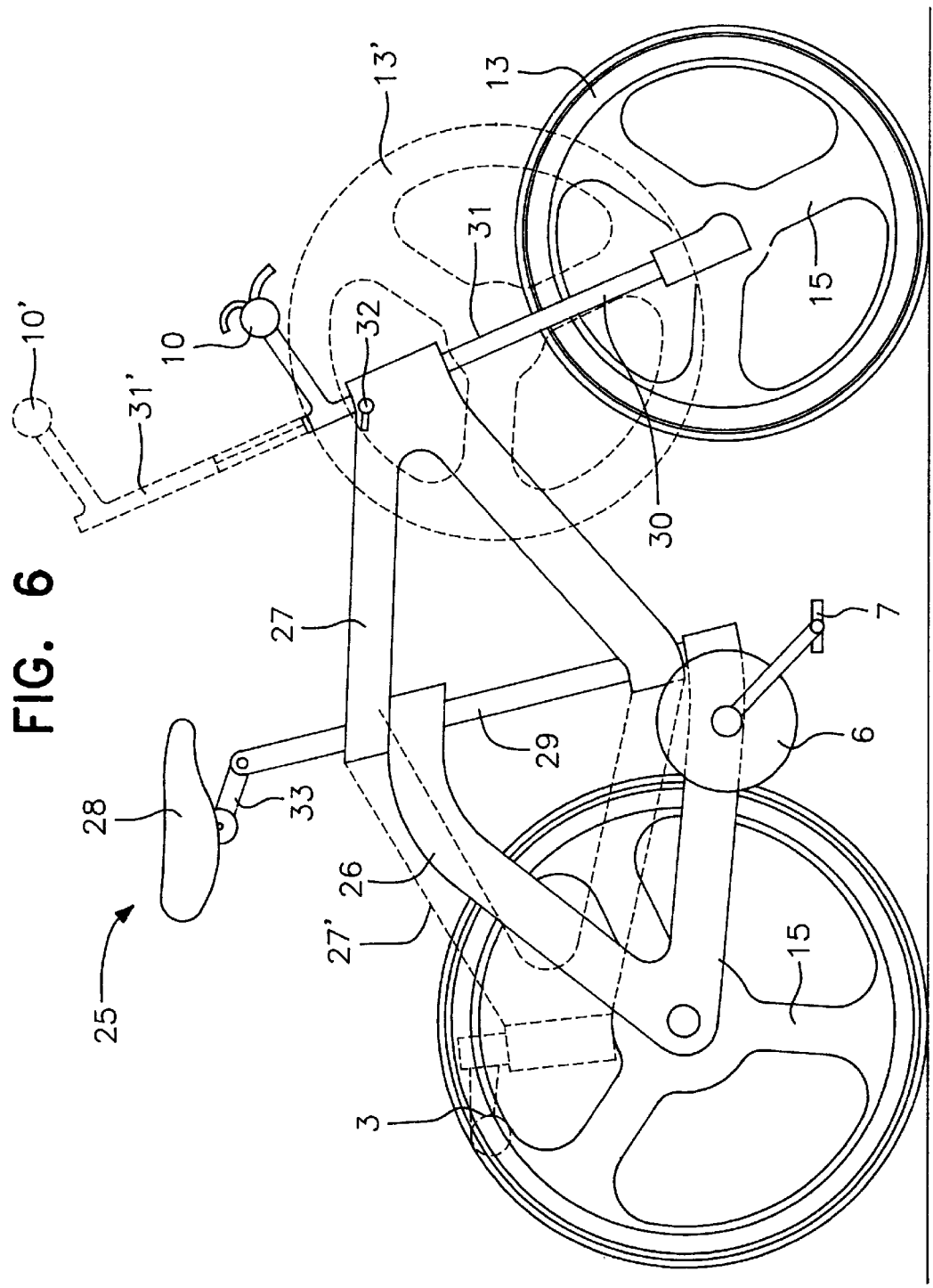
FIG. 6 shows in a side view similar to FIG. 1 a schematic illustration of a modified embodiment of the inventive bicycle.

FIG. 6 shows a modified embodiment of a bicycle 25, wherein two frame parts 26 and 27 consisting of two frame tubes forming a sharp angle are pivotable around a frame tube 29 bearing the saddle 28. Here, for example, the free ends of the tubes of the frame parts 26 and 27 encompass the frame tube 29. Like in the previous embodiments, both the front wheel 13 as well as the back wheel 3 are hinged on one side to the rear frame part 26 or to an arm 30 of the shaft tube 31. Here again, the wheels have thickened spokes 15.

To allow also in this embodiment according to FIG. 6, with a turning of the frame parts 26 and 27 towards each other around the axis, defined by the frame tube 29 and forming an angle with the vertical line, an embedding of the wheels 3 and 13, an additional height-adjustability of the shaft tube 31 in the front frame part 27 is provided for and for this purpose a simple lock is indicated with 32. For folding or collapsing, the lock 32 is opened and the shaft tube 31 with the handlebar 10 together with the front wheel 13 is raised into the position 31', indicated by a dotted line, whereafter, when pivoting the front frame part 27 relatively to the rear frame part 26 around the inclined axis, which is defined by frame tube 21, the front part of the frame reaches the position defined as 27' and shown by a dotted line and the front wheel 13 is once again completely embedded in the free space of the back wheel 3, being provided by the unilateral or one-sided support and therefore again a very small width of the bicycle in the folded position can be achieved, as is indicated in FIG. 5.

Furthermore, in this embodiment the saddle 28 can be lowered by a hinge mechanism 33, so that total height can be reduced in the folded position of the bicycle.

Figure 7:
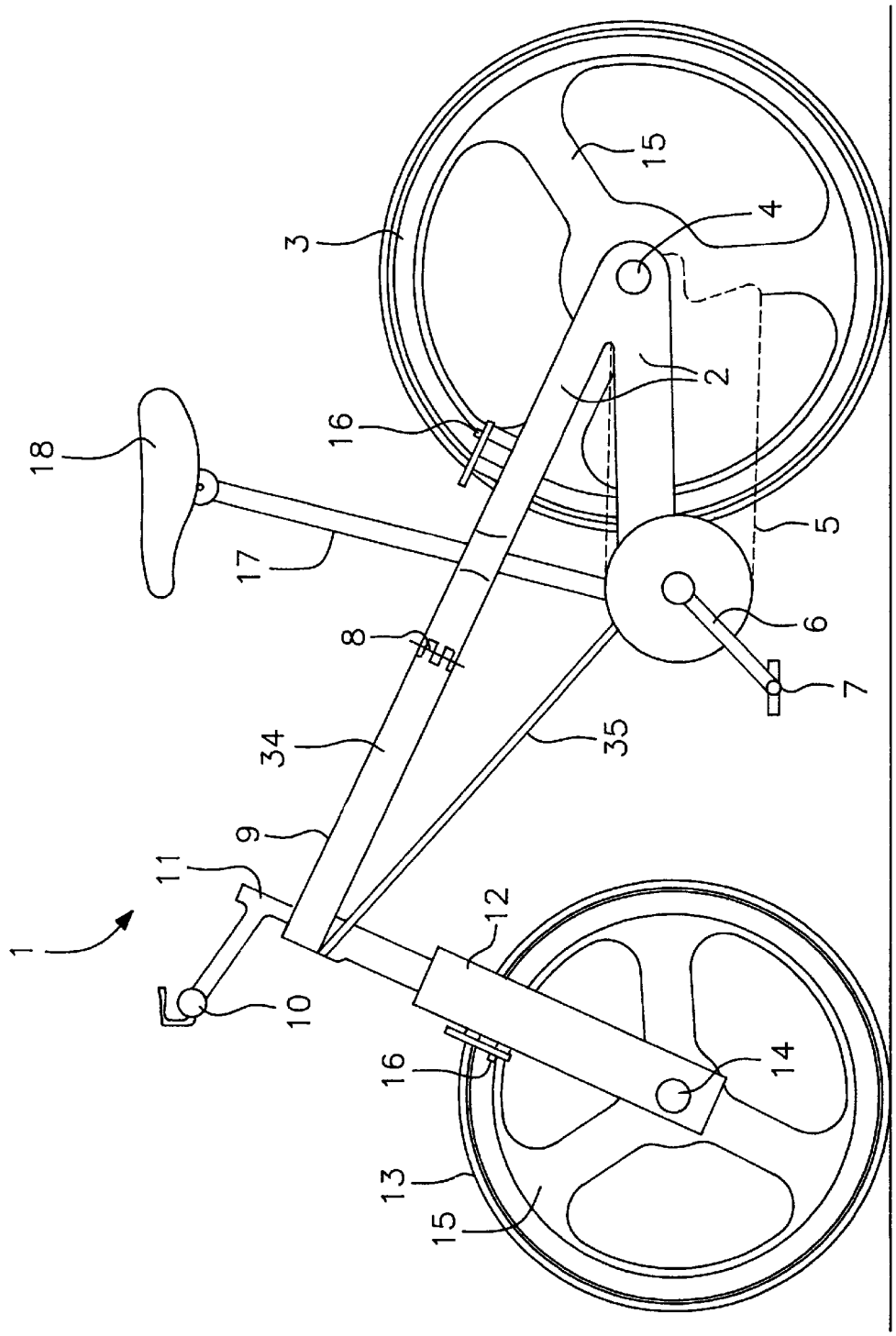
FIG. 7 shows a schematic side view of a further modified embodiment of the inventive bicycle, in which the lower frame element is designed as a rope.

In the further modified embodiment in accordance with FIG. 7 of a bicycle, the numerals of FIG. 1 are kept for the most part, wherein the frame of the bicycle 1 consists of the front and rear frame parts 9 and 2, wherein the rear frame part is rigidly designed and the front frame part 9 is divided into an upper frame tube 34, which is provided with a hinge 8 positioned in the middle of the support axles 4 and 14 on the wheels 3 and 13, and a lower frame element 35. The lower frame element 35 is here made of a rope made of a flexible material, especially of a steel rope, so that a hinge in the lower frame element 35 is not required for the turning or pivoting of the bicycle into its folded position. The rope 35 is sufficiently flexible to be turned or bent into the folding position of the bicycle and at the same time is adequately tensed and stressed to provide the frame of the bicycle 1 with sufficient stability, especially torsion stability, even when the bicycle is under heavy load. In order to guarantee a sufficient strength and stability of the frame, the rope 35 is welded to the rear frame part 2 and to the front frame part 9 in the area of the support of the shaft tube 11 bearing the handlebar 10.

What is claimed is:

1. A bicycle comprising:
    a frame,
    a front wheel having a tire mounted on a rim and a back wheel having a tire mounted on a rim, said front wheel and said back wheel being mounted on the frame,
    the frame being foldable from an extended position into a folded position to reduce an overall length of the bicycle,
    the back wheel being unilaterally supported on one side on the frame and the front wheel being unilaterally supported on one side on a tube rotatably attached to the frame,
    the front and rear wheels having different diameters, the rim of the wheel with a smaller diameter, in the folded position of the frame, being embedded within the rim of the wheel with a larger diameter to reduce an overall width of the bicycle in the folded position.

2. The bicycle according to claim 1, wherein the wheels are supported by spokes engaging the rim at the one side of the rim which is unilaterally supported.

3. The bicycle according to claim 1, wherein the back wheel and the front wheel are unilaterally mounted on the frame on the one side of the frame on which a drive chain for the bicycle is mounted.

4. The bicycle according to claim 1, wherein one of the wheels has a bearing formed by a hollow shaft, in which in the folded position of the bicycle, a bearing of the other wheel is embedded.

5. The bicycle according to claim 1, wherein the frame is foldable around an essentially central position located between rotation axles of the wheels, the frame is foldable by hinges on the frame essentially positioned one above the other.

6. The bicycle according to claim 5, wherein frame tubes are angled at the hinges.

7. The bicycle according to claim 5, wherein parts of the frame are moveably attached to an intermediate element, and a distance between the hinges at least minimally exceeds half of the sum of outer dimensions of the parts of the frame.

8. The bicycle according to claim 1, wherein the frame consists of two frame elements, each of which form an angle, and which are fitted around a frame tube bearing a saddle.

9. The bicycle according to claim 1, wherein frame tubes of the frame lie essentially in a parallel position in the folded position.

10. The bicycle according to claim 1, wherein the frame comprises an upper, rigid frame tube, turnable around a hinge, located in a nearly centered position between axles of the wheels, and a lower frame element including a rope.

11. The bicycle according to claim 1, wherein a shaft tube bearing of the front wheel and a handlebar are height adjustably attached to the frame.

12. The bicycle according to claim 1, wherein a handlebar is attached to a shaft tube by a locking device and is moveable in an aligned position with the wheels in the folded position of the frame.

13. The bicycle according to claim 1, wherein parts of the frame are pivotable towards each other and can be fastened by jigs both in the extended position of the bicycle and in the folded position of the frame.

14. The bicycle according to claim 1, wherein drive pedals are pivotable into a position adjacent to a drive crank mounted on the frame.

15. The bicycle according to claim 1, wherein a saddle on the frame can be lowered from an operating position to a pulled-in position by a hinge mechanism.

* * * * *